UNITED STATES PATENT OFFICE.

GEORGE W. POND, OF BROOKLYN, NEW YORK, ASSIGNOR TO MARY E. POND, OF SAME PLACE.

IMPROVEMENT IN PAINT COMPOUNDS.

Specification forming part of Letters Patent No. 152,513, dated June 30, 1874; application filed April 11, 1874.

*To all whom it may concern:*

Be it known that I, GEORGE W. POND, of Brooklyn, in the county of Kings and State of New York, have invented a new and useful Improvement in Paint Composition, of which the following is a specification:

Various attempts have been made to utilize coal-tar by applying it as paint, either separately or combined with other substances; but, so far, no combination or process has been discovered by which it has been adapted for anything more than a black—its natural color. My invention consists in a composition consisting, mainly, of coal-tar; but coal-tar so changed, by the combination of other substances with it, that it readily takes a variety of colors, has its objectionable odor removed, and forms a most excellent adhesive paint for iron as well as wood work, and for the various purposes for which colored paints are used.

In forming my improved paint composition, I, in the first place, take a quantity of coal-tar as it comes from the gas-house, and to every gallon thereof I add six (6) ounces of nitric acid to "cut" or "burn" the tar. A thick sedimentary substance is deposited from the tar, leaving a comparatively pure liquid remaining, which is poured off into a suitable vessel, and, preferably, filtered through animal charcoal and flannel to decolorize it. A quantity of rosin is then combined with it— fourteen (14) pounds for each gallon. The liquid is next subjected to the action of heat for about one hour, in order to melt the rosin. While the liquid is hot, I add a little sulphuric acid in order to deodorize the liquid or divest it of all offensive odor. After the rosin and sulphuric acid have been added, the composition is well stirred or agitated for about one hour, so that the ingredients will become thoroughly mixed. In this condition the composition will freely take any of the ordinary colors used in painting. Naphtha or equivalent liquid is used in thinning to bring the paint to the proper consistence for use.

A paint thus prepared is, from its adhesive character, admirably adapted for all description of iron-work as well as for wood, and is superior to oil-paint in point of durability.

This paint readily dries and hardens under water, either salt or fresh water, and effectually resists the attack of the *teredo spiralis*, which is so destructive to sea-going vessels. It is, consequently, very valuable as a paint for all marine vessels.

The liquid to which the color or colors are added to form the paint proper is almost as clear and transparent as water, having, however, a peculiar glassy appearance.

The paint may be produced at a cost of about one-fourth of the commonly-used varieties.

Having thus described my invention, I claim as new, and desire to secure by Letters Patent—

1. The process of forming a paint from coal-tar by combining with it nitric acid, rosin, and sulphuric acid, in the order and manner hereinbefore set forth.

2. The improved paint produced by the process hereinbefore set forth.

GEORGE W. POND.

Witnesses:
   T. B. MOSHER,
   ALEX. F. ROBERTS.